United States Patent [19]

Langballe et al.

[11] Patent Number: 4,977,858
[45] Date of Patent: Dec. 18, 1990

[54] ANIMAL FEEDING APPARATUS

[75] Inventors: Logan C. Langballe, Winnetka, Ill.; Bernhard Koszewa, Menomonee Falls, Wis.; Steen Blicher, Faaborg, Denmark

[73] Assignee: Biomat Feeding Systems, Inc., Evanston, Ill.

[21] Appl. No.: 340,949

[22] Filed: Apr. 20, 1989

[51] Int. Cl.$^5$ .............................................. A01K 5/02
[52] U.S. Cl. ................................. 119/51.5; 119/56.2; 119/57.4
[58] Field of Search ............... 119/51.5, 57.1, 57.2, 119/57.4, 56.2, 72

[56] References Cited

U.S. PATENT DOCUMENTS

| | | | |
|---|---|---|---|
| 2,743,860 | 5/1956 | Saxe | 119/56.2 X |
| 3,144,173 | 8/1964 | France et al. | 119/56.2 X |
| 3,185,134 | 5/1965 | Sheets | 119/72 |
| 3,450,101 | 6/1969 | Avrea | 119/51.5 |
| 3,508,524 | 4/1970 | Harms | 119/57.2 |
| 3,534,708 | 10/1970 | Cauffman | 119/51.5 X |
| 4,422,409 | 12/1983 | Walker et al. | 119/51.5 X |
| 4,481,907 | 11/1984 | Blicher | 119/51.5 X |
| 4,604,970 | 8/1986 | Blicher | 119/51.5 X |
| 4,656,969 | 4/1987 | Rapp et al. | 119/51.5 X |
| 4,739,726 | 4/1988 | Azuma | 119/57.2 |
| 4,771,734 | 9/1988 | Blicher | 119/51.5 X |

FOREIGN PATENT DOCUMENTS

| | | | |
|---|---|---|---|
| 8500397 | 9/1986 | Netherlands | 119/57.1 |
| 88/04888 | 7/1988 | PCT Int'l Appl. | 119/51.5 |

*Primary Examiner*—Robert P. Swiatek
*Assistant Examiner*—Todd E. Manahan
*Attorney, Agent, or Firm*—Welsh & Katz, Ltd.

[57] ABSTRACT

Apparatus is disclosed for feeding animals in at least two stages of development. The apparatus includes animal feeding places arranged in two adjacent, opposing rows which physically isolate one group of animals from a second group of animals. The two rows can be controlled and operated independently of each other, to provide different predetermined amounts of dry feed and water to the feeding places in each of the two rows. A feed supply duct is provided above each of the feeding places. The lower outlet ends of the feed supply ducts have a square cross-sectional area for more efficient delivery of dry feed to the feeding places. Feed is measured and discharged into each of the feeding places in a row by a movable feed pushing plate which pushes a predetermined amount of feed into the feeding places from beneath the lower outlets of the ducts in that row. The feed pushing plate is moved by a cylinder which is vertically oriented to conserve space within the apparatus, and is coupled by a lever which provides relatively high leverage, for greater reliability. Water is provided to the animals through main water pipes which can be adjusted to compensate for irregularities in the floor or other surface on which the apparatus is installed.

4 Claims, 3 Drawing Sheets

ANIMAL FEEDING APPARATUS

This invention relates to animal feeding apparatus, and more particularly, to animal feeding apparatus which is reliable, efficient and economical to use and operate, even in hostile agricultural environments.

BACKGROUND OF THE INVENTION

Animal feeding apparatus such as that disclosed, for example, in U.S. Pat. No. 4,604,970, can be used to feed a group of animals predetermined amounts of food and water at predetermined times. However, several improvements in the apparatus described in the '970 patent have improved the reliability, efficiency and economy of that apparatus in commercial installations.

The apparatus disclosed here includes several improvements over the apparatus disclosed in the '970 patent. More specifically, the disclosed apparatus can accommodate animals in different stages of development so that both heavy and light weight animals can be fed different amounts of feed from the same equipment. In addition, feed is transferred to the animals more efficiently, and the apparatus can be easily adjusted to compensate for uneven floors and the like which are often encountered in commercial use. It is also more reliable than the previously disclosed apparatus, and uses space within the apparatus more efficiently.

Accordingly, one object of this invention is to provide new and improved apparatus for feeding animals.

Another object is to provide new and improved apparatus for feeding animals which is more reliable, efficient and economical than known animal feeding apparatus.

Still another object is to provide new and improved animal feeding apparatus which can accommodate animals in different stages of development.

Yet another object is to provide new and improved apparatus which can be adjusted to compensate for uneven floors and the like as they are encountered in commercial environments.

A still further object is to provide new and improved apparatus which is more reliable than previously known apparatus, and uses space within the apparatus more efficiently.

SUMMARY OF THE INVENTION

In keeping with one aspect of this invention, an apparatus is disclosed for feeding animals in at least two stages of development. The apparatus includes a plurality of animal feeding places arranged in two adjacent opposing rows of feeding places which physically isolate one group of animals from a second group of animals. The two rows can be controlled and operated independently of each other, to provide different predetermined amounts of dry feed and water to the places in each of the two rows.

A feed supply duct is provided above each of the feeding places. The lower outlet end of the feed supply ducts have a square cross-sectional area for improved removal of the feed from beneath the ducts. Dry feed is supplied to the feed supply ducts by a central feeding system which can include an auger, a cable and disk system, or other suitable apparatus which can provide dry feed to the apparatus.

The outlet ends of the ducts rest adjacent to a fixed rail, with a space between the ends of the ducts and the rail. This space is determined by set screws which permits adjustment of the lower ends of the ducts and secures the lower ends properly during use. Openings in the rail are provided on each side of each of the ducts so that dry feed which is placed over the openings falls by gravity into a feeding place beneath the opening. A predetermined amount of feed is discharged from the ducts through a selected opening in the rails. The feed is measured and discharged into all of the feeding places in one row by a movable feed pushing plate. The plate pushes a predetermined amount of feed from beneath the lower outlets of the ducts through openings adjacent one side of the ducts. In this manner, each of the animals in the row of feeding places receives an equal, predetermined amount of dry feed each time the plate moves.

A cylinder is coupled to a selected end of each feed pushing plate by a lever. The cylinder is vertically oriented to utilize the space within the apparatus, and is coupled to the plate by a lever which provides relatively high leverage, for greater reliability.

The cylinder pistons are operated by water under pressure. As water is forced into one end of the cylinder, water previously placed in the other end of the cylinder is forced into a main water supply pipe. The main water pipe is adjustable to compensate for irregularities in the surface on which the apparatus is installed, so that the pipe is level. When water from one end of the cylinder is pushed into the main pipe, that amount of water flows into the feeding places in substantially equal amounts through openings in the top of the main pipe. Siphoning is prevented by air vents coupled to the openings. In this manner, each of the feeding tubes in the row of places receives an equal, predetermined amount of water and dry feed at desired times.

BRIEF DESCRIPTION OF THE DRAWINGS

The above mentioned and other features of the invention and the manner of obtaining them will become more apparent, and the invention itself will be best understood by reference to the following description of an embodiment of the invention, taken in conjunction with the accompanying drawings, in which.

DETAILED DESCRIPTION

Figure 1:
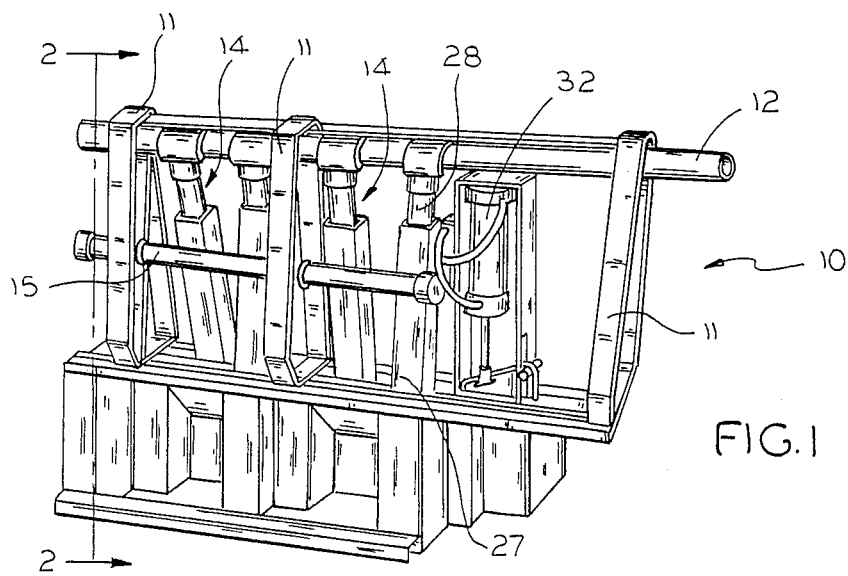
FIG. 1 is a perspective view of an embodiment of the apparatus of this invention.
Figure 2:
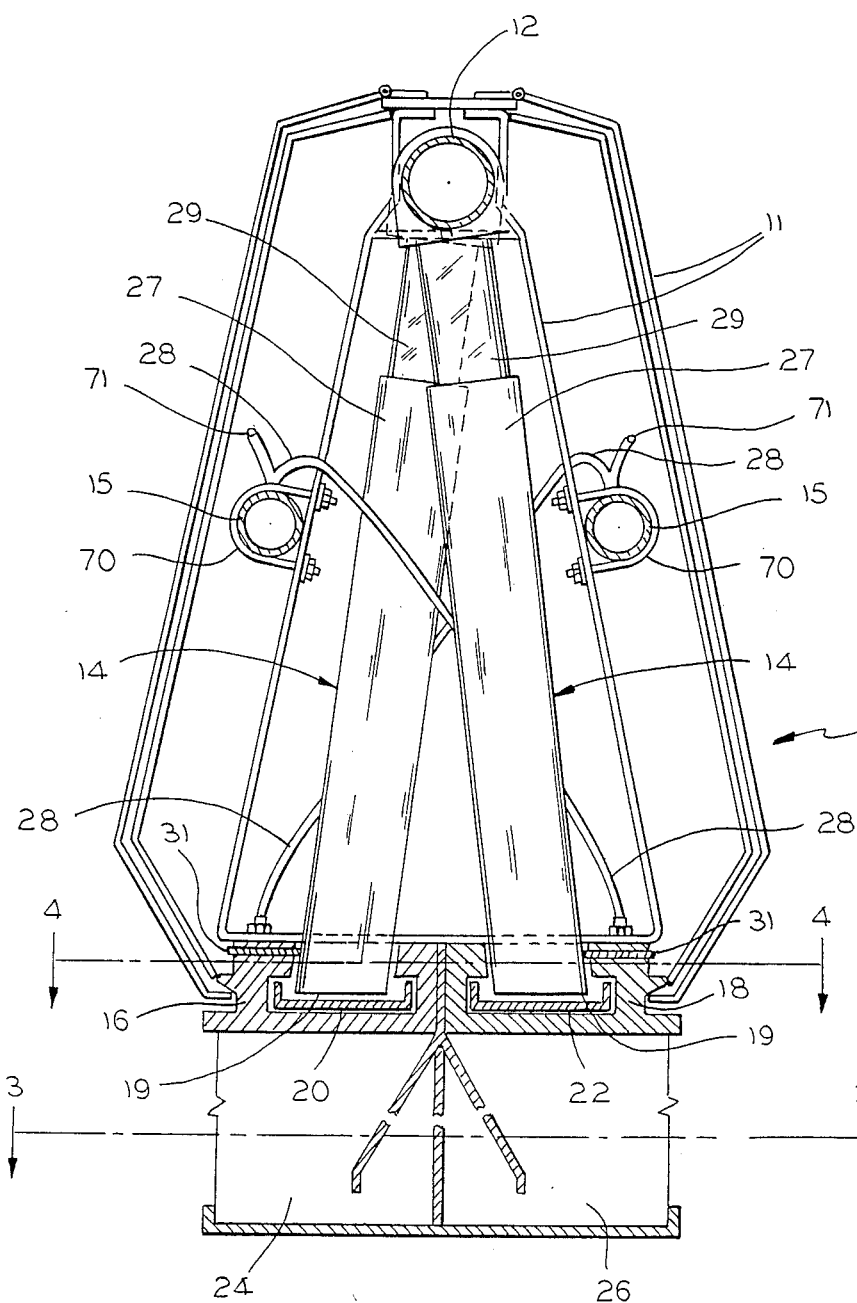
FIG. 2 is a detailed sectional end view of the apparatus of FIG. 1, taken along lines 2—2 in FIG. 1.
Figure 3:
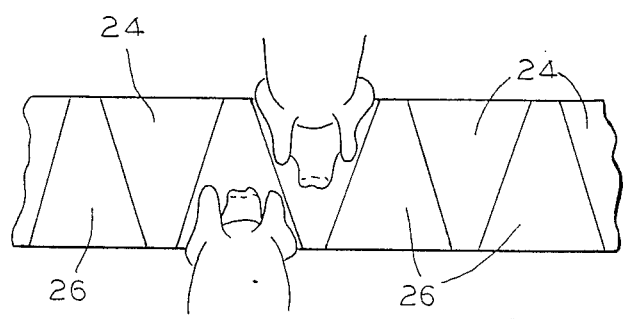
FIG. 3 is a sectional view of the apparatus of FIGS. 1 and 2, taken along lines 3—3 in FIG. 2.

As seen in FIGS. 1 and 2, animal feeding apparatus 10 includes a frame 11, a main dry feed pipe 12 which fills a plurality of feed supply ducts 14 with dry feed, and a pair of rails 16, 18 and feed pushing plates 20, 22 for dispensing predetermined amounts of dry feed into a plurality of feeding places 24, 26 arranged in two opposing rows, as seen in FIG. 3.

Figure 4:
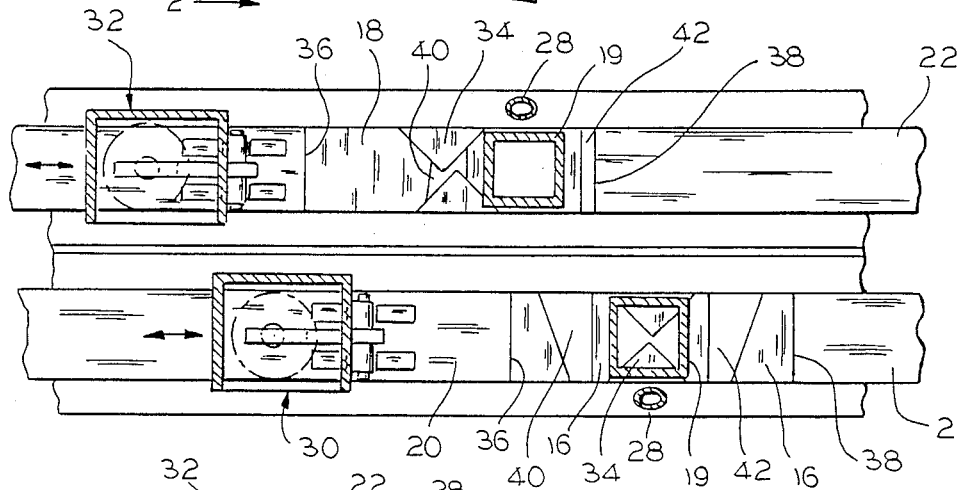
FIG. 4 is a detailed sectional view of a portion of the apparatus of FIGS. 1 and 2, taken along lines 4—4 in FIG. 2.

The apparatus 10 also includes a main water pipe 15 for each row of feeding places 24, 26, water feed tubes 28 dispensing water from the pipes 15 to each of the feeding places 24, 26, and cylinders 30, 32 (FIG. 4). As will be seen, the cylinders 30, 32 are hydraulic motors which provide predetermined amounts of water to the tubes 28 through the pipes 15, and simultaneously move the plates 20, 22, respectively, to dispense a predetermined amount of dry feed to each of the feeding places 24, 26 at desired times.

The feeding places 24 and 26 are arranged in opposing rows so that one group of animals in one stage of development, such as a particular weight range, for example, can be fed in the row of feeding places 24, and another group of animals in the same or a different stage of development can be fed in the row of feeding places 26. The amount of feed and water given to the animals in the two groups, and the time intervals between feedings, can be controlled by a known computer system 33 (FIG. 9) or other apparatus, to obtain efficient use of the dry feed.

The rows 24, 26 preferably extend along the entire length of an animal pen, so that animals in different stages of development can easily be physically isolated from each other. The rows 24, 26 are adjacent to each other in FIGS. 1, 2 and 3, although other configurations are contemplated. It is also contemplated that the rows themselves could be divided into independently operated segments of feedings places, to accommodate animals in still different stages of development.

Dry feed is supplied to all of the feeding places 24, 26 by the dry feed pipe 12, shown in FIGS. 1 and 2, as dry feed is needed. One duct 14 is provided for each feeding place 24, 26.

The ducts 14 have outlet ends 19 which are square in cross-section, as seen in FIGS. 1, 2 and 4. By using a square cross-section, the ducts 14 dispense feed more effectively than previously known ducts, which had round outlet ends.

The ducts 14 include a telescoping section 27 and a fixed section 29. Telescoping section 27 slidably fits over the fixed section 29 so that the outlet ends 19 can be adjusted to fit in the rails 16 and 18. The rails 16, 18 may be made of any suitable material, although ultra high molecular weight polyethylene, available from Solidur Plastics Co., Dellmont, Pa. 15626, is preferred because it is virtually impervious to the conditions often encountered in agricultural environments and requires minimal maintenance.

The exact height of the telescoping section 27 can be determined by placing a removable spacer (not shown) between the end 19 and the adjacent rail. The section 27 is then secured in the proper place by tightening a set screw 31 and then removing the spacer plate.

Figure 5:
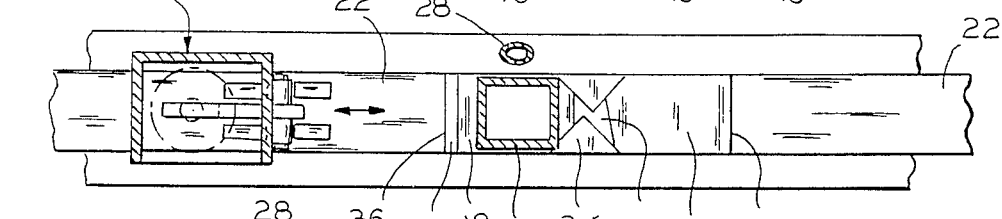
FIG. 5 is a view of a portion of the apparatus shown in FIG. 4 in a different operating position.

Plates 20 and 22 are provided in the rails 16 and 18, respectively. The plates 20, 22 can slide laterally, as seen in FIGS. 4 and 5. The plates 20, 22 include a pair of opposing triangular projections 34 for each feeding place 24 and 26. The projections 34 pass beneath the outlet end 19 of each duct 14, moving dry feed between the rail and duct end. In FIG. 4, a pair of projections 34 is beneath the center of the duct outlet end 19 of the rail 16, and the projections 34 are to the left of the duct outlet end 19 of the rail 18. The projections 34 of the plate 22 are shown to the right of the outlet end 19 in FIG. 5. The plates 20, 22 are open between the projections 34 and edges 36 on one side, and the projections 34 and edges 38 on the other side.

The rails 16, 18 each include an opening 40 to the left of each outlet end 19, and an opening 42 to the right of each outlet end 19, as seen in FIGS. 4 and 5. Both of the openings 40, 42 are over a single feeding place 24, 26, so that dry feed which is pushed over an opening 40 or 42 by the projections 34 drops into the same feeding place.

Figure 7:
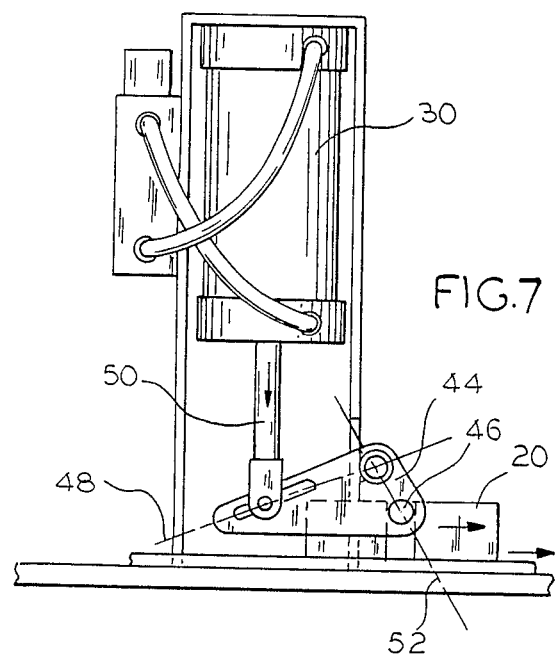
FIG. 7 is a detailed view of a cylinder used in the apparatus of FIG. 1, shown in a first selected position.
Figure 8:
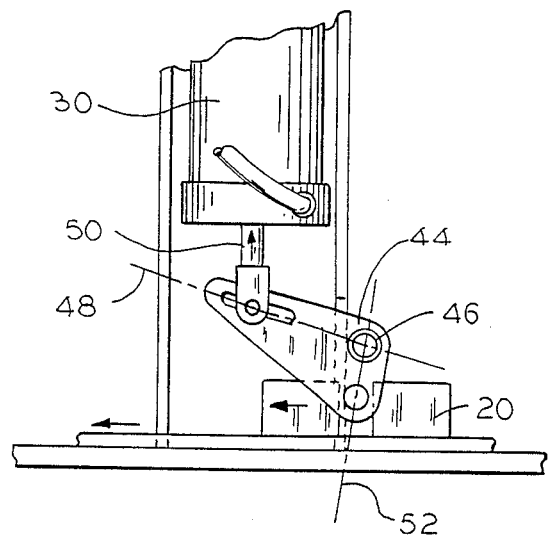
FIG. 8 is another detailed view of the cylinder of FIG. 7, shown in a second selected position.

The plates 20, 22 are moved to the left and right by the cylinders 30, 32, respectively, by the use of levers 44, as shown in FIGS. 7 and 8. Each lever 44 includes a pivot point 46 which is hingedly secured to the frame 11, a first moment arm having an axis 48 secured to cylinder shafts 50, and a second moment arm having an axis 52 secured to the plates 20, 22. The first arm 48 is longer than the second arm 52, however, to reduce the torque required to move the plates 20, 22 by increasing leverage. This leverage increases the reliability of the apparatus, and its efficiency in operation, as well.

Figure 9:
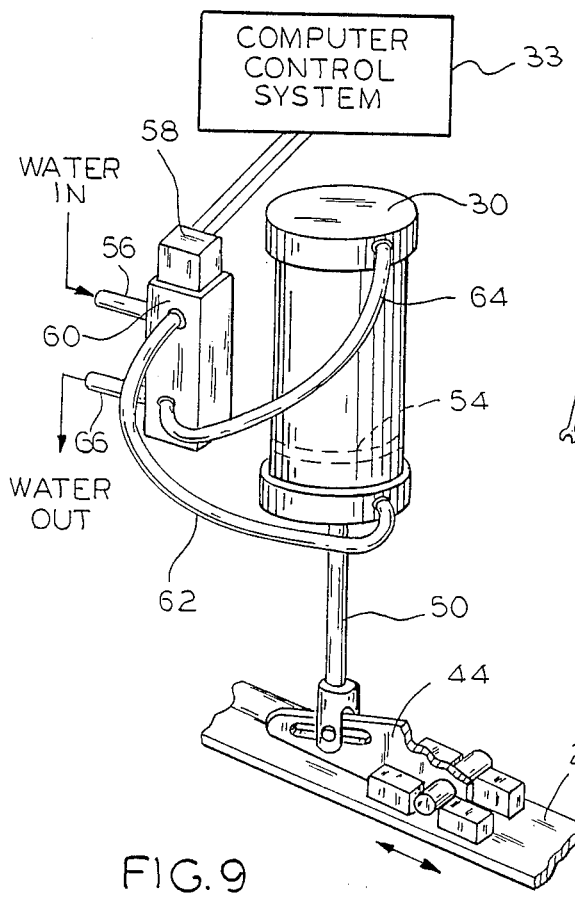
FIG. 9 is a still another detailed view of the cylinder of FIG. 7.

The cylinders 30, 32 are vertically oriented, as seen in FIG. 9, and are preferably located at an end of the apparatus 10. The vertical orientation reduces the space required for the cylinders in the frame 11, and the end location of the cylinders uses open space at the end of the apparatus more efficiently, and improves serviceability.

Cylinders 30 and 32 operate in the same manner, so for clarity only cylinder 30 will be discussed here in detail. It should be understood, however, that cylinder 32 is constructed and operates in the same manner as the cylinder 30. The cylinder 30 has a piston 54 which is operated by water under pressure which enters the cylinder through an inlet 56. An electric solenoid 58 controls a valve 60 which directs the water through one of two hoses 62, 64. When the hose 62 is selected, the piston 54 and the shaft 50 are pushed upwardly, raising the lever 44 and moving the plate 20 to the left in FIG. 9. The plate 20 pushes a predetermined amount of dry feed into the rail opening 40 as it moves left.

Figure 6:
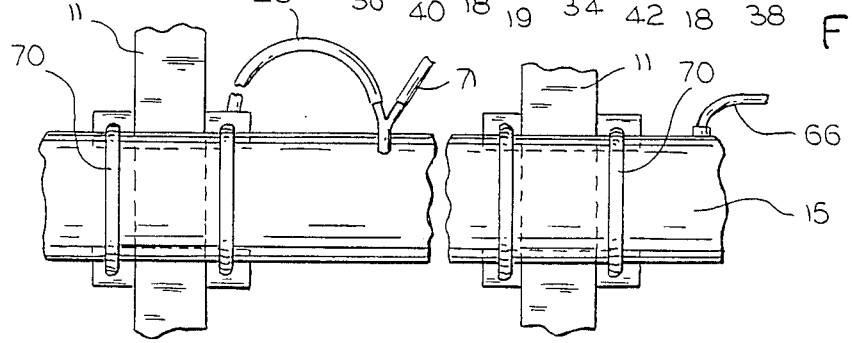
FIG. 6 is a detailed view of the water feed system of the apparatus shown in FIG. 1.

When the piston 54 reaches the top end of the cylinder 30, the solenoid 58 stops the flow of water, leaving the water just pumped in the bottom of the cylinder. As the piston 54 moves, however, water placed in the top of the cylinder during the previous cycle is forced out of the cylinder 30 through the hose 64. That water leaves through a water outlet 66 and passes through a hose 68 to one of the main water pipes 15 as seen in FIG. 6.

On the next cycle, the solenoid 58 operates the valve 60 so that water flows from the inlet 56 to the top end of the cylinder 30 through the hose 64. The piston 54 is pushed down, and the water previously forced into the cylinder exits through the hose 62 and outlet 66 to the appropriate main pipe 15. As the piston 54 moves down, the plate 20 moves to the right, dropping dry feed through the opening 42.

A main water pipe 15 is provided for each row of feeding places, as seen in FIG. 2. The main pipes 15 are secured to the frame 11 with U-clamps 70 (FIG. 6) or the like which permit the pipes 15 to be adjusted so that they are substantially level to the ground, regardless of variations in the floor or other surface on which the apparatus 10 is installed.

A tube 28 is provided for each feeding place 24, 26 The tubes 28 are secured to the top of the main pipes 15 so the water is only forced through the tubes 28 when the main pipes 15 overflow. This occurs when the pipes 15 are filled with water and the piston 50 is moved. In that event, the water which leaves the cylinder forces an equal amount of water into each of the tubes 28. An air vent 71 is secured to each tube 28 to avoid siphoning. The vents 71 extend above the highest point of the tubes 28, however, to avoid spillage through the vents 71.

Figure 10:
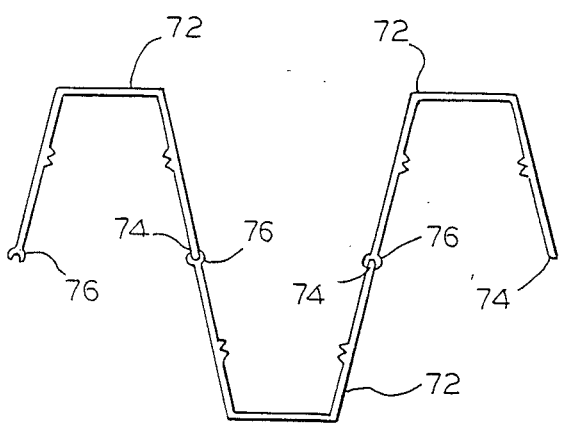
FIG. 10 is a detailed view of a portion of the apparatus of FIG. 3.

The rows of feeding places 24, 26 are made by a single, continuous strip of metal such as aluminum or the like, as seen in FIG. 3. The strip is made up of a series of interconnecting sections 72, as seen in FIG. 10. Each section 72 includes a ball end 74 which fits in a socket end 76 of an adjacent section.

The apparatus 10 is controlled by a computer system or other apparatus which operates the solenoids 58 at predetermined times to feed the animals in each row of feeding places 24, 26 at desired times. The length of each feeding is related to the size of the animals being fed. Generally, one mouthful of dry feed, with a predetermined amount of water, is pushed into the feeding places each time the plates 20, 22 move. By using two separated rows of feeding places, however, two groups of animals can be fed different amounts at each feeding, as desired, to make the most efficient use of the dry feed.

In operation, the apparatus 10 is installed in an agricultural environment so that animals of different size can be isolated from each other, with one group of animals feeding from the row of feeding places 24, and another group of animals feeding from the row of feeding places 26. The telescoping sections 27 of the ducts 14 are adjusted and secured by the set screws 31 so that a single mouthful or other desired amount of feed rests between the outlet ends 19 and the rails 16, 18, and the plates are moved so that the projections 34 are to a selected side of the outlet ends 19. The main pipes 15 are adjusted so that they are level with the ground, and are filled with water.

When the solenoid 58 connected to the cylinder 30, for example receives a proper signal from the computer control system, water enters the hose 62 or 64 and moves the plate 20, depositing a mouthful of feed in each of the feeding places 24. In addition, water previously placed in the cylinder 30 is forced into the main pipe 15 on the right in FIG. 2, and equal amounts of water are pushed through the tubes 28 and into the feeding places 24 When the solenoid 58 is activated again, the valve 60 sends water through the other hose 62, 64, and the water placed in the cylinder on the previous cycle is removed through water outlet 66.

The many advantages of this invention are now apparent. The animal feeding apparatus described here is more reliable, efficient and economical than previously known animal feeding apparatus. It can accommodate animals in different stages of development, and can be adjusted to compensate for uneven floors and the like as they are encountered in commercial environments. The apparatus is more reliable than previously known apparatus, and uses space more efficiently.

While the principles of this invention have been described above in connection with specific apparatus and applications, it is to be understood that this description is made only by way of example and not as a limitation on the scope of the invention.

What is claimed is:

1. Apparatus for supplying predetermined amounts of dry feed and water to a group of animals comprising:
   a plurality of animal feeding places;
   dry feed supply means for supplying dry feed to said animal feeding places, said dry feed supply means being capable of filling a plurality of feed supply ducts with dry feed, each of said ducts having a lower outlet end, one of said feed supply ducts being provided for each of said feeding places;
   feed discharge means between said lower outlet ends of said ducts and said feeding places for discharging said feed into each of said feeding places, said feed discharge means having at least one immovable, elongated rail, said rail having a first opening adjacent one side of each of said lower outlet ends of said ducts and a second opening adjacent an opposing side of each of said duct ends, said first and second openings being located over a single said feeding place;
   feed pushing means arranged between the outlet ends of said feed supply ducts and said feed discharge means, said feed pushing means being movable so as to push predetermined amounts of dry feed from each feed supply duct;
   liquid supply means for supplying aqueous liquid to each of said feeding places, said liquid supply means having a main pipe which extends along all of said feeding places, said main pipe having adjustment means for compensating for irregularities in the surface on which the apparatus is installed, so that said main pipe is level with respect to the horizontal;
   a hydraulic motor coupled to a selected end of said feed pushing means;
   said hydraulic motor having a vertically oriented reciprocable double-acting piston arranged within a cylinder, said piston being coupled to said feed pushing means by a lever having a pivot point, the moment arm between said piston and said pivot point being greater than the moment arm between said pivot point and said feed pushing means;
   means coupling said liquid supply means to said hydraulic motor for supplying liquid to said motor under superatmospheric pressure as a driving medium therefor;
   operating means for separately driving said motor to supply feed in an amount substantially proportional to the amount of liquid utilized as a driving medium for said motor; and
   liquid discharge means for discharging the liquid from said motor and for dispensing all or a predetermined proportion of liquid into said feeding places;
   whereby the amount of feed discharged produces a mixture in said feeding places containing a predetermined proportion of liquid and feed.

2. The apparatus of claim 1 wherein each of said ducts has a lower outlet end which has a square cross-sectional area.

3. Apparatus for supplying predetermined amounts of dry feed and water to a first group of animals in one stage of development, and a second group of animals in a second stage of development comprising:
   a plurality of animal feeding places arranged in first and second adjacent, opposing rows which physically isolate said first group of animals from said second group of animals;
   dry feed supply means for supplying dry feed to said animal feeding places, said dry feed supply means being capable of filling a plurality of feed supply ducts with dry feed; each of said ducts having a lower outlet end; one of said feed supply ducts being provided for each of said feeding places;

feed discharge means between said lower outlet ends of said ducts and said feeding places for discharging said feed into each of said feeding places, said feed discharge means having an immovable, elongated rail in each of said rows, said rails having a first opening adjacent the left of each of said lower outlet ends of said ducts and a second opening adjacent the right of each of said ducts ends, said first and second openings being located over a single said feeding place;

first feed pushing means arranged between the outlet ends of said feed supply ducts and said feed discharge means in said first row of feeding places, said first feed pushing means being movable so as to push predetermined amounts of dry feed from each feed supply duct in said first row;

second feed pushing means arranged between the outlet ends of said feed supply ducts and said feed discharge means in said second row of feeding places, said second feed pushing means being movable so as to push predetermined amounts of dry feed from each feed supply duct in said second row;

liquid supply means for supplying aqueous liquid to each of said feeding places, said liquid supply means having a first main pipe which extends along all of said feeding places in said first row, and a second main pipe which extends along all of said feeding places in said second row, said main pipes being separately adjustable to compensate for irregularities in the surface on which the apparatus is installed, so that said main pipes are level with respect to the horizontal;

a first hydraulic motor coupled to a selected end of said first feed pushing means;

a second hydraulic motor coupled to a selected end of said second feed pushing means;

said first and second hydraulic motors each having a vertically oriented reciprocable double-acting piston arranged within a cylinder, each of said pistons being coupled to said feed pushing means by a lever having a pivot point, the moment arms between said pistons and said pivot points being greater than the moment arms between said pivot points and said feed pushing means;

means coupling said liquid supply means to said first and second hydraulic motors for supplying said liquid to said motors under superatmospheric pressure as driving mediums therefor;

operating means for separately driving said first and second motors to supply said feed in an amount substantially proportional to the amount of said liquid utilized as a driving medium for said motors;

means for controlling said operating means for independent operation of said first and second feed pushing means; and liquid discharge means for discharging said liquid from said motors and for dispensing all or a predetermined proportion of said liquid into said feeding places;

whereby the amount of feed discharged produces a mixture in said feeding places containing a predetermined proportion of said liquid and said feed.

4. The apparatus of claim 3, wherein each of said ducts has a lower outlet end which has a square cross-sectional area.

* * * * *